United States Patent [19]
Boyce

[11] 3,716,285
[45] Feb. 13, 1973

[54] METHOD OF MANUFACTURING SUBMINIATURE ELECTRIC LAMPS
[75] Inventor: Walter A. Boyce, Glen Ridge, N.J.
[73] Assignee: Westinghouse Electric Corp., Pittsburgh, Pa.
[22] Filed: Aug. 18, 1971
[21] Appl. No.: 172,673

Related U.S. Application Data
[62] Division of Ser. No. 889,663, Dec. 31, 1969, Pat. No. 3,636,398.

[52] U.S. Cl. ..........................316/21, 65/58, 65/138
[51] Int. Cl. ..........................H01j 9/38, H01j 17/26
[58] Field of Search ..........316/19, 20, 21, 24; 65/58, 65/138, 45

[56] References Cited

UNITED STATES PATENTS

| | | | |
|---|---|---|---|
| 3,537,276 | 11/1970 | Pityo | 65/59 |
| 3,409,342 | 11/1968 | Anderson et al. | 316/24 |
| 3,551,725 | 12/1970 | Brundige | 313/318 |
| 3,416,851 | 12/1968 | Palermo et al. | 316/19 |

Primary Examiner—Charles W. Lanham
Assistant Examiner—D. M. Heist
Attorney—A. T. Stratton et al.

[57] ABSTRACT

The lamp (which may be of the incandescent or photoflash type) has a composite envelope that is fabricated by sealing segments of light-transmitting and infrared-radiation absorbing glass tubing together in abutting relationship. The end of the infrared-radiation absorbing portion of the composite envelope is then hermetically sealed to the lead wires and the seal is formed by focusing a beam of infrared radiation onto the seal assembly. The envelope is evacuated, and filled with gas if desired, through its opposite end which is then tipped off. Oxidation of the lead wires is reduced to a minimum by forming the seal inside a chamber that is evacuated, or filled with an inert gas, and has walls which transmit infrared radiation. In the case of chamber-sealing, the free end of the light-transmitting portion of the envelope is sealed before the envelope-mount assembly is placed into the chamber so that the sealing and evacuation (or gas filling) operations are performed simultaneously.

6 Claims, 7 Drawing Figures

PATENTED FEB 13 1973 3,716,285
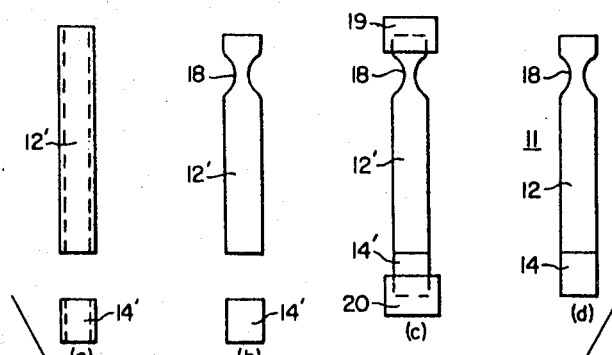
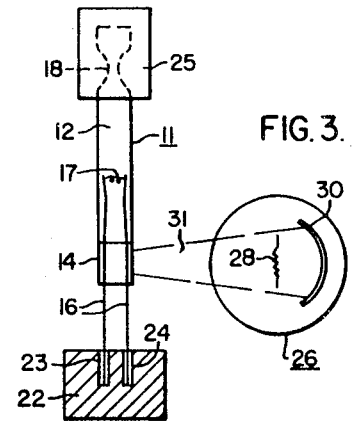
FIG. 2.
FIG. 3.
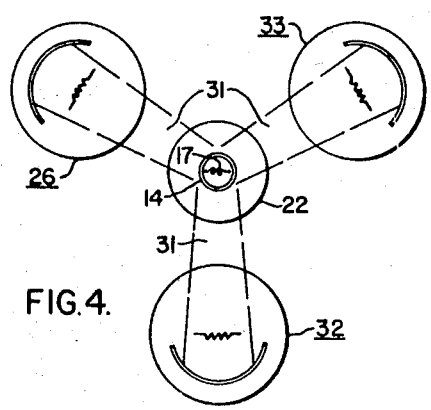
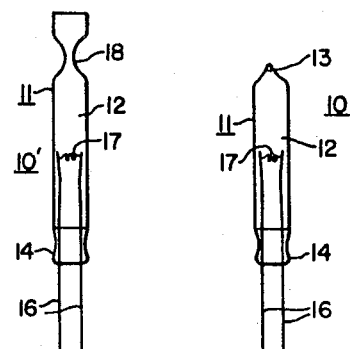
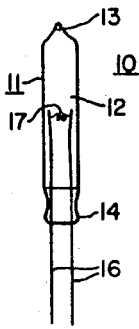
FIG. 4.
FIG. 5.  FIG. 1.
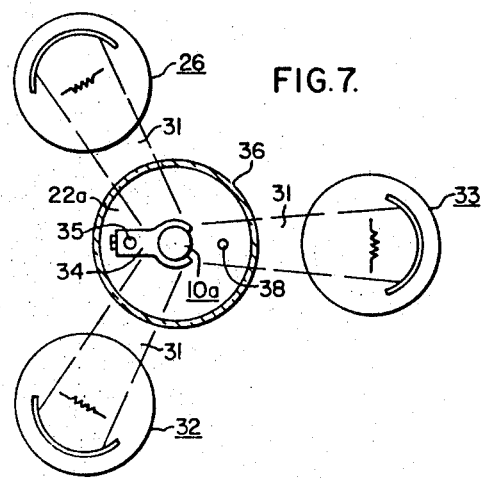
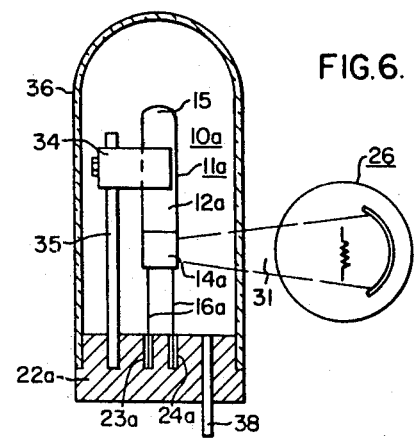
FIG. 7.
FIG. 6.

METHOD OF MANUFACTURING SUBMINIATURE ELECTRIC LAMPS

CROSS-REFERENCES TO RELATED APPLICATIONS

The present application is a division of application Serial No. 889,663, filed Dec. 31, 1969 (now U.S. Pat. No. 3,636,398) and, broadly considered, is also related to the subject matter disclosed in the commonly-assigned application Ser. No. 805,231 of W. L. Brundige filed March 7, 1969 and entitled "Method of Tipping Off the Exhaust Tube of an Electric Lamp, And A Baseless Single-Ended Incandescent Lamp Produced By Such Method" (now U.S. Pat. No. 3,551,725).

BACKGROUND OF THE INVENTION

1. Field of the Invention

The present invention relates to electric lamps and has particular reference to an improved method for manufacturing subminiature lamps of the incandescent or photoflash type.

2. Description of the Prior Art

Electric lamps of extremely small size are well known in the art and are referred to as subminiature or microminiature lamps. Because of their small dimensions, such lamps are difficult to manufacture and present quality control problems which are not encountered in larger size lamps. A microminiature incandescent lamp having an envelope that is sealed by a glass bead which is melted by passing electric current through the filament and lamp leads during the sealing-in operation is disclosed in U.S. Pat. No. 3,275,879 issued Sept. 27, 1966, to P.C. Demarest et al. Another incandescent lamp of this type having a quartz envelope that is sealed by heating the quartz and press-sealing it around the lead-in conductors is described in U.S. Pat. No. 3,462,209 issued Aug. 19, 1969, E.G. Fridrich. A microminiature photoflash lamp having an envelope which is sealed by a glass bead which is fused to the mouth of the envelope by sharply-defined sealing fires is disclosed in U.S. Pat. No. 3,263,457, issued Aug. 2, 1966, to H. Reiber.

While satisfactory lamps can be made using such techniques, they require accurately-dimensioned interfitting envelopes and beads or the use of gas sealing fires and pressing-sealing operations which are difficult to control due to the extremely small size of the parts being joined. Unless adequate precautions are taken, the combustion products of the sealing fires will contaminate the finished lamps and excessive oxidation of the metal parts of the lamps can easily occur which may cause "leaky" seals.

OBJECTS AND SUMMARY OF THE INVENTION

It is accordingly the general object of the present invention to provide a convenient and practical method for manufacturing an electric lamp of the subminiature or microminiature type.

A more specific object is the provision of a method for manufacturing such lamps without the use of sealing fires, press-forming operations, or accurately-formed interfitting glass beads or the like that make it difficult and time-consuming to assemble the lamps and create conditions during the sealing-in operation which could contaminate the lamp or badly oxidize the lead wires or filament.

The foregoing objectives and other advantages are achieved in accordance with the present invention by making the end segment of the envelope from infrared-absorbing glass and sealing it to the lead-in wires with infrared radiation that is focused onto the seal assembly. In accordance with one embodiment, the filament mount is sealed into one end of the composite envelope with infrared energy and the envelope is evacuated through its opposite end which is then tipped off with conventional sealing fires.

In another embodiment, oxidation of the lead wires during the sealing-in operation is practically eliminated by placing the composite envelope and filament mount in sealing relationship within an enclosure that has infrared-transmitting walls and is evacuated. The infrared energy source is located outside the enclosure and the infrared radiation is transmitted through the walls of the enclosure and focused onto the end of the envelope to form the hermetic seal, thus completing the lamp. The chamber can be filled with a suitable inert gas, such as nitrogen or the like, to provide a gas-filled lamp if desired. Since the lamp is concurrently evacuated (or gas filled) and sealed in accordance with this embodiment, the opposite end of the envelope is sealed off when the composite envelope is formed. Preformed envelopes having flat or domed ends can thus be used.

In either case, the envelope is sealed to the lead wires in a very convenient and efficient manner without the use of gas-sealing fires or accurately dimensioned beads or the like.

BRIEF DESCRIPTION OF THE DRAWING

A better understanding of the invention will be obtained by referring to the accompanying drawings, wherein:

FIG. 1 is an enlarged side elevational view of a subminiature incandescent lamp made in accordance with the present invention;

FIGS. 2(a) to 2(d) are elevational views illustrating the various phases in the manufacture of the composite envelope employed in the lamp shown in Fig. 1;

FIG. 3 is an elevational view, partly in section, illustrating the apparatus and procedure employed to seal the envelope to the lead wires;

FIG. 4 is a plan view of a preferred sealing apparatus wherein three infrared-generating incandescent lamps are equidistantly spaced around the seal assembly to accelerate the sealing-in operation;

FIG. 5 is an elevational view of the sealed-in lamp prior to the exhaust and tipping-off operations;

FIG. 6 is an elevational view, partly in section, of another sealing apparatus which permits the seal to be effected in an evacuated or gas-filled chamber; and, FIG. 7 is a plan view of a similar apparatus wherein three projection lamps are used as exterior infrared-generating sources.

DESCRIPTION OF THE PREFERRED EMBODIMENTS

In FIG. 1 there is shown a subminiature incandescent lamp 10 of the type produced by the present invention. As noted, it consists of a composite tubular envelope 11 having a light-transmitting body portion 12 that is terminated at one end by a protruding seal tip 13 of fused glass and at its opposite end by a fused body 14 of infrared-absorbing glass. The glass body 14 is hermetically sealed to a pair of lead-in conductors 16, such as "dumet" wires, that are fastened to an incandescible filament 17 and hold it within the light-transmitting portion 12 of the envelope 11. The filament 17 comprises a coil of suitable refractory wire such as tungsten that is connected as by spot welding to the inner ends of the leadin wires 16. The latter are preferably composed of "dumet" wire and are of such rigidity that the filament 17 is supported within the envelope 11 solely by the lead-in wires. A glass stem or bead is accordingly not required. "Dumet" wire is well known in the art and consists of a nickel-iron core wire that is clad with copper and then heat treated to controllably oxidize the copper surface. The core wire and copper cladding are bonded together metallurgically so that the composite wire has a continuous metal structure. The core wire gives strength to the "dumet" and its expansion as close to that of the soft glasses, such as lead glass, which are used in the envelopes of subminiature lamps of this type.

The term "subminiature" as used herein and in the dependent claims refers to electric lamps having an overall length less than about 25 millimeters and a maximum envelope diameter less than about 10 millimeters and includes within its scope lamps of very small dimensions that are referred to in the art as microminiature lamps. The lamp 10 shown in FIG. 1 had an overall length of approximately 10 millimeters and employed a T1 envelope having an outside diameter of approximately 3 millimeters.

As a specific example of suitable glasses, the light-transmitting portion 12 of the envelope 11 is composed of a soda-lead glass well known in the art. A typical formulation for such a glass is as follows:
62.7 percent $SiO_2$, 6.8 percent $Na_2O$, 6.6 percent $K_2O$, 21.8 percent $PbO$, 1.7 $R_2O$, and 0.4 percent incidental impurities (where $R_2O$ is one or more additional alkali metal oxide such as LiO.)

The fused end segment 14 of the envelope 11 is composed of a suitable infrared-absorbing glass that contains a small but sufficient amount of iron oxide to render the glass infrared absorbing. Such infrared-absorbing glasses are also well known in the art and are commercially available as Corning Code 9362 and Code 9363 sealing glasses. The glasses are green-colored potash-soda-lead glasses that have viscosity and expansion characteristics that are almost identical with Corning Code 0120 soda-lead glass so that the end segment 14 of the envelope 11 can be readily sealed to the light-transmitting body portion 12. The information published by Corning indicates that Code 9362 and Code 9363 glasses have very high energy absorption in the infrared region from approximately 1 to 4 microns wavelength and that Code 9363 glass has lower expansion characteristics which make it superior to Code 9362 glass for sealing to "dumet" wire. Thus, an end segment 14 made of either of these glasses can be quickly heated and fused to the lead-in wires 16 by a focused beam of infrared radiation.

Transparent infrared-absorptive sealing glasses such as those disclosed in U.S. Pat. No. 3,445,256, issued May 20, 1969, which contain selected amounts of $PbO$, $SiO_2$, $Fe_3O_4$ and alkali metal oxides can also be used.

MANUFACTURING METHOD AND APPARATUS (FIGS. 2-5)

The various operations in fabricating the composite envelope 11 are shown in FIGS. 2(a) to 2(d) and will now be described. As illustrated in Fig. 2(a), the envelope 11 includes a segment 12' of suitable soda-lead glass tubing and a shorter tube segment 14' that is of the same diameter but composed of infrared-absorbing glass. One end of the soda-lead glass tubing 12' is heat-softened and partially collapsed to form a constriction 18, as shown in Fig. 2(b). The tube segments 12' and 14' are then placed in end-to-end abutting relationship and the opposite ends of the segments are temporarily closed off from the atmosphere by rubber caps 19 and 20 or the like, as illustrated in Fig. 2(c). The abutting portions of the tube segments are then sealed together by a suitable gas fire (not shown), thus forming the composite envelope 11 shown in Fig. 2(d). The softened abutting ends of the segments 12' and 14' are prevented from collapsing inwardly during the sealing operation by the air which is trapped within the tubes by the caps 19 and 20.

As shown in FIG. 3, the resulting composite envelope 11 is then placed over a filament mount that comprises the spaced lead-in wires 16 and joined filament 17. The mount is held in upstanding position within the envelope 11 by inserting the ends of the lead wires 16 into a head 22 that has pockets 23 and 24 which nestingly accommodate the ends of the wires. The envelope 11 is maintained in sealing relationship with the filament mount by a suitable holder 25 that grips the upper end of the envelope. The end segment 14 is then melted and collapsed down onto the underlying portions of the lead-in wires 16 by energizing a suitable infrared-energy source 26 and concentrating the infrared radiation into a beam 31 that is focused onto the segment 14. In the embodiment shown in FIG. 3, the infrared-radiation source 26 comprises a 500 watt T12 "focus beam" projection lamp that has a coiled tungsten filament 28 and an internal reflector 30 which concentrates the infrared energy into a focused beam 31.

As shown in Fig. 4, three 500 watt "focused beam" type projection lamps 26, 32 and 33 are preferably used and are spaced approximately 120° apart around the seal assembly so that the beams 31 of infrared energy are focused onto the end segment 14 of the envelope 11 and rapidly and uniformly heat the glass to its melting temperature. With this arrangement, an hermetic glass-to-metal seal was formed within approximately 15 seconds in the case of the aforesaid T1 type envelope. Any source of infrared energy having means for focusing the radiations can be used. Thus, a suitable reflector and a halogen type infrared incandescent lamp of sufficient wattage could be used in place of the aforementioned "focused beam" type projection lamps.

The resulting sealed-in lamp 10' is then evacuated by connecting the open end of the envelope 11 to a suitable exhaust system (not shown) and the constriction 18 is tipped off with a sharply-defined gas flame in the usual manner, thus producing the finished lamp 10 shown in FIG. 1. A suitable inert fill gas, such as nitrogen or the like at one or several atmospheres pressure, can be introduced into the envelope 11 after it has been evacuated and before it is tipped off to provide a gas-filled lamp, if desired.

The present invention can also be employed to manufacture subminiature photoflash lamps. This can readily be accomplished by placing a suitable actinic fuel, such as a weighed amount of shredded zirconium, into the envelope 11 near the constriction 18 before the envelope is placed over the filament mount and sealed to the lead-in wires 16. In this case, the filament 17 need not be coiled but can consist of a straight piece of fine tungsten wire which preferably extends beyond the tips of the lead wires. A suitable ignition material or primer may be applied to the tungsten filament or to the tips of the lead wires 16 in accordance with conventional photoflash lamp-making practice. Of course, the envelope 11 in this case is also filled with oxygen at a suitable pressure such as 10 atmospheres and a protective plastic coating is applied to the exterior surface of the envelope 11 to prevent it from shattering when the photoflash lamp is fired.

ADDITIONAL EMBODIMENT (FIGS. 6–7)

In FIG. 6 there is shown another embodiment of the invention which enables a subminiature electric lamp to be simultaneously sealed and evacuated, or filled with a suitable inert gas. This embodiment also enables pre-blown composite envelopes 11a to be used. As shown, the end of the light-transmitting tubular portion 12a of such an envelope is sealed during the bulb-making operation by heating and molding it into a smooth dome 15.

As before, the filament mount is supported in upstanding position within the envelope 11a by a head 22a having a pair of pockets 23a and 24a which nestingly receive the ends of the lead wires 16a. The domed composite envelope 11a is supported in enclosing and sealing relationship with the filament mount by a bulb-holder 34 that is adjustably fastened to a support arm 35 anchored to the head 22a. The entire assembly is protected from the atmosphere by an enclosure 36 that is composed of a suitable infrared-transmitting material, such as quartz or Vycor glass, and is hermetically joined to the peripheral edge of the head 22a. The resulting air-tight chamber is evacuated through a suitable conduit 38 that extends through the head 22a and sealing of the infrared-absorbing glass portion 14a of the envelope 11a is achieved by energizing an exterior source of infrared radiation, such as a "focused beam" type projection lamp 26, and directing the focused beam 31 of infrared radiation through the side wall of the enclosure 36 onto the seal assembly.

Oxidation of the lead-in wires 16 during the sealing-in operation is, of course, practically eliminated with this technique since the fusion of the envelope end segment 14a with the lead wires 16a is accomplished in a vacuum. If a gas-filled lamp 10a is desired, then the enclosure 36 is filled with a suitable inert gas at the desired pressure after the chamber is evacuated and before the sealing-in operation is begun.

As will be noted in FIG. 7, equidistantly spaced sources of infrared energy, such as three "focused beam" projection lamps 26, 32 and 33, are preferably employed since this effects uniform heating of the glass segment 14a and reduces the time required to complete the seal.

It will be appreciated from the aforesaid that the objects of the invention have been achieved in that a very simple and practical method and apparatus have been provided for manufacturing subminiature type electric lamps. The glass-to-metal seal is achieved with infrared energy and permits lamps of very small size to be made without excessively oxidizing the lead-in wires or contaminating the lamp with gas-combustion products from sealing fires.

I claim as my invention:

1. The method of manufacturing a subminiature electric lamp comprising:

sealing a hollow member of light-transmitting glass in end-to-end abutting relationship with a segment of infrared-absorbing glass tubing to form a composite glass envelope, fastening a pair of lead wires to an incandescible filament to form a self-supporting mount, holding said mount by the free ends of said lead wires, placing the composite envelope over and in enclosing relationship with said mount so that the infrared-absorbing portion of said envelope encircles said wires at a location remote from said filament, holding said envelope and filament mount in such position and concurrently focusing infrared radiation onto the infrared-absorbing glass portion of the envelope to melt the latter and form a hermetic seal with the underlying portions of said lead wires, evacuating said envelope through the open end thereof, and then heating and sealing off the open end of said envelope.

2. The method of claim 1 wherein;

said composite envelope is of elongated tubular configuration, an end segment of the light-transmitting portion of said composite envelope is locally heated and partially collapsed to form a constriction, and said envelope is subsequently sealed off by heating and tipping off said constriction.

3. The method of claim 1 wherein said lamp comprises subminiature photoflash lamp and said envelope is charged with actinic fuel and filled with oxygen prior to being sealed off.

4. The method of claim 1 wherein;

the free ends of said hollow member of light-transmitting glass and said segment of infrared-absorbing glass tubing are temporarily sealed off from the atmosphere while being sealed together, and the melting of the infrared-absorbing end portion of said envelope and the formation of the hermetic seal with the lead wires is achieved by placing three infrared-generating incandescent lamps at substantially equidistantly spaced locations around the envelope and focusing the generated infrared-radiations onto the infrared-absorbing end portion of said envelope.

5. The method of manufacturing a subminiature electric lamp comprising;

sealing a hollow member of light-transmitting glass in abutting end-to-end relationship with a segment of infrared-absorbing glass tubing to form a composite envelope, heating the free end of said light-transmitting glass member to plasticity and forming a smooth dome-shaped end wall that closes that end of the envelope, fastening a pair of lead wires to an incandescible filament to form a self-supporting mount, holding said mount by the free ends of said lead wires, placing the composite envelope over said mount and holding the envelope in enclosing relationship therewith to provide an envelope-mount assembly wherein the infrared-absorbing end portion of the envelope encircles said lead wires at a location remote from said filament, placing said envelope-mount assembly within an air-tight enclosure which has an infrared-radiation transmitting wall that is located adjacent the infrared-absorbing end portion of the envelope, evacuating said air-tight enclosure, and passing infrared radiation through the said wall of the enclosure and focusing said radiation onto the infrared-absorbing end portion of said envelope to thereby melt the latter and form an hermetic seal with the underlying portions of said lead wires.

6. The method of claim 5 wherein said air-tight enclosure is filled with an inert gas after it has been evacuated and before the hermetic seal is formed so that the completed lamp contains an atmosphere of said inert gas.

* * * * *